Dec. 5, 1939.  S. M. HANLEY  2,182,666
ELECTRICAL REGULATING SYSTEM
Filed April 30, 1938
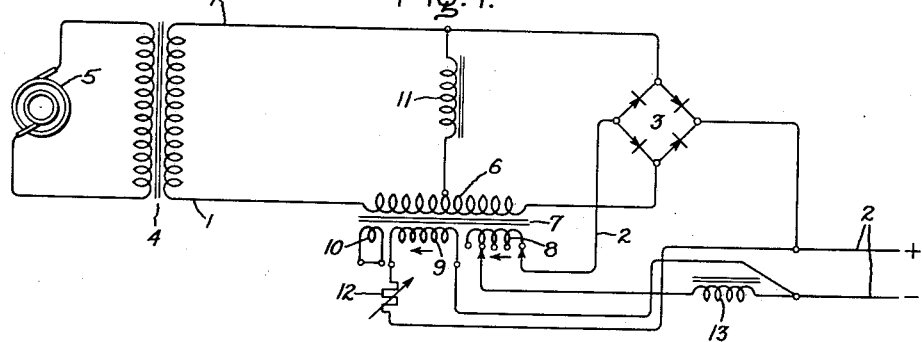
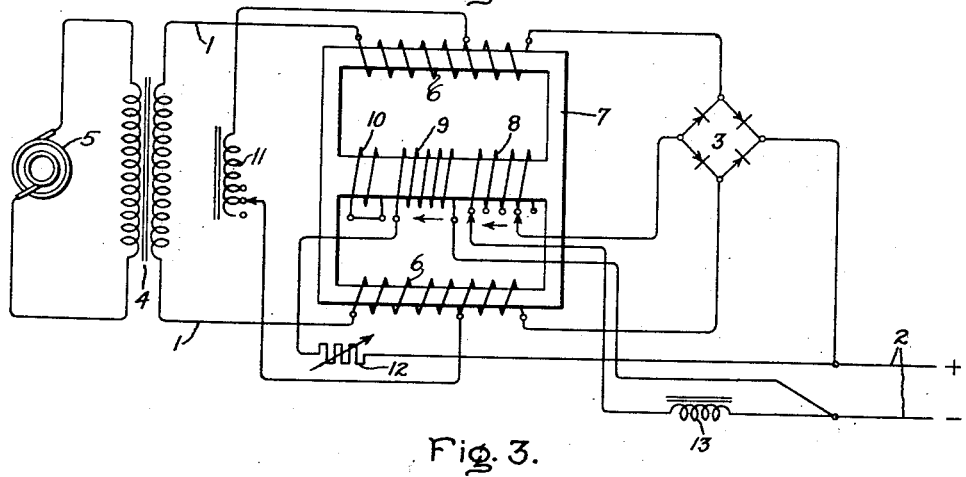
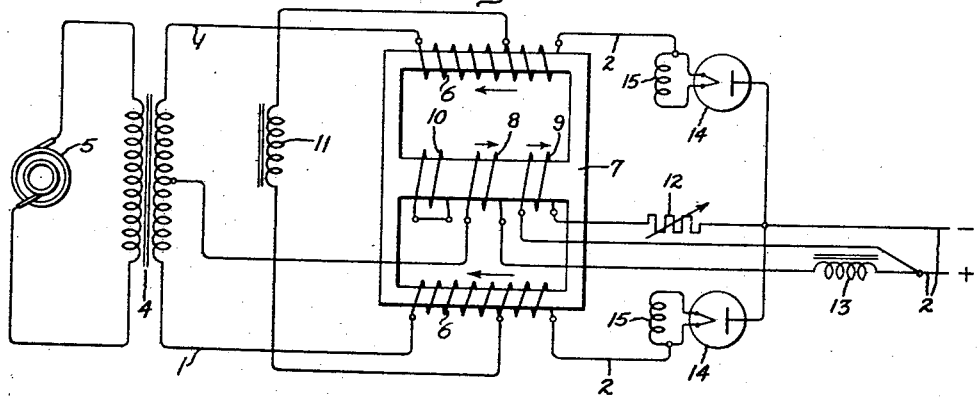
Inventor:
Stanley M. Hanley.
by Harry E. Dunham
His Attorney.

Patented Dec. 5, 1939

2,182,666

UNITED STATES PATENT OFFICE 2,182,666

ELECTRICAL REGULATING SYSTEM

Stanley M. Hanley, Detroit, Mich.

Application April 30, 1938, Serial No. 205,298

7 Claims. (Cl. 175—363)

This invention relates to electrical regulating systems and more particularly to a static regulating system for rendering the output voltage of a rectifier substantially independent of variations in load and supply voltage.

By a static regulating system is meant a system utilizing no moving parts, such as contacts, solenoid plungers, rotating armatures, etc.

The invention is particularly adapted for use with dry disk type rectifiers having output ratings up to and including five-hundred watts and it is characterized by the use of non-linear volt ampere characteristic impedances, such as saturable iron core reactors.

An object of the invention is to provide a new and improved automatic voltage regulator circuit.

Another object of the invention is to provide a static voltage regulating system for rectifiers which will maintain substantially constant voltage across a linear volt ampere characteristic load regardless of reasonable variations in load value or supply voltage or both.

A further object of the invention is to provide an automatic voltage regulator system for dry disk type rectifiers, which is provided with means for compensating for the effect of aging of such rectifiers.

The invention will be better understood from the following description taken in connection with the accompanying drawing and its scope will be pointed out in the appended claims.

In the drawing,

Fig. 1 shows in diagrammatic form an embodiment of the invention using what may be described as an asymmetrical connection of a direct current saturable core reactor, Fig. 2 is a modification utilizing what may be described as a symmetrical connection of a three-legged core reactor, and Fig. 3 is another modification differing from Fig. 2 in that a vacuum tube rectifier is used instead of a dry disk type rectifier.

Referring now to the drawing and more particularly to Fig. 1, there is shown therein an alternating current supply circuit 1 and a direct current load circuit 2. Interconnecting these circuits is a rectifier 3 in the form of a bridge-connected dry disk type of rectifier. Such rectifiers are well-known and perhaps the most common form is the ordinary copper-oxide rectifier. The alternating current supply circuit 1 may be energized in any suitable manner, such as by means of a supply transformer 4 energized by an alternating current generator 5.

Connected in series in the alternating current supply circuit is a variable reactance alternating current winding 6 of an iron core reactor which is provided with a magnetically saturable iron core 7. This reactor is provided with a pair of direct current saturating windings 8 and 9, the functions of which will be described below and it is preferable, although not necessary, that it be provided with a short-circuited winding 10 for reasons which will be explained hereafter. This reactor may be of any of the several well-known forms of this device. In general, all of these forms are characterized by a core arrangement which prevents the production of a net alternating voltage in the direct current windings. Well-known examples of such devices are standard three-legged and four-legged core reactors or multi-core reactors in which the individual direct current windings on each core are connected in series in such a way that the alternating voltages induced therein neutralize each other in the series circuit.

Automatic compensation of the voltage of the load circuit 2 for changes in load is secured by connecting the direct current winding 8 in the load circuit. This winding is provided with a plurality of taps so that its effectiveness may be increased or decreased so as to compensate for changes in the resistance of the rectifier 3 caused by aging.

Compensation of the load voltage for variations in supply voltage is obtained by means of a negative impedance current characteristic device 11 connected in shunt circuit relation with the supply circuit. This device may be of any suitable type having the desired characteristic and as shown it consists of a self-saturating iron core reactor. This device has one terminal connected on the load side of at least a portion of the variable reactance winding 6. For reasons which will be explained hereafter, improved operation is secured by connecting this device to an intermediate point on the winding 6 rather than to the supply circuit on the load side of this winding.

In order to adjust the impedance value of the series reactance winding 6 so as to match its value with the non-linear characteristic of device 11, the direct current saturating winding 9 is connected in shunt circuit relation with the load circuit and suitable adjusting means, shown by way of example as a rheostat 12, is provided for adjusting the current in the shunt saturating winding.

In order to prevent the occurrence of an oscillating flux in the portion of the core carrying the unidirectional winding, the short-circuited winding 10 is placed thereon. This winding produces a damping effect, and by this action in retarding changes in flux it substantially eliminates flux oscillations, such as would be caused by the use of a filter condenser connected across the direct current load circuit. A conventional smoothing reactor 13 is connected in the load circuit.

The operation of Fig. 1 is as follows. Assume first that the supply voltage is constant and that the load current is variable. Under these conditions if the load increases, current through the series saturating winding 8 increases, thereby saturating the core 7 and reducing the reactance of the winding 6. By properly proportioning the parts the reduction in reactance of the series winding 7 may be made to offset the increase in voltage drop in the entire system due to the increase in load current, so that the load voltage will be substantially unaffected by increases in load current. In a like manner, if the load current decreases the core 7 will be worked at a lower point on its magnetization curve, thus increasing the reactance of the series winding 6 and compensating the entire circuit for the decrease in voltage drop in the rest of the circuit caused by the decrease in current. In this manner, the load voltage becomes substantially independent of load current.

Assume now that the load remains constant but the supply voltage varies. If the supply voltage increases the device 11 will saturate and, thus, will cause its reactance to decrease with the result that a non-linear increase in current flows through that portion of the series winding 6 which is on the supply side of the device 11. This causes an increase in voltage drop in the winding 6 which can be made to offset the increase in supply voltage. Similarly, if the supply voltage decreases the device 11 will cause a non-linear decrease in current through a part of the winding 6, thus reducing the voltage drop in the winding 6 by an amount sufficient to compensate the load circuit for the decrease in supply voltage.

For best operation I have found that the core materials for the main reactor and for the self-saturating device 11 should be different. Thus, the core for the device 11 should have a relatively abrupt saturation point so that relatively small changes in applied voltage will cause relatively large changes in current through the device 11. However, when such different core materials are used I have found that the operation of the circuit is materially improved and the regulating operation is much better if the device 11 is connected to an intermediate point on the winding 6 rather than to the end of this winding on the load side thereof. A possible explanation of this improved operation is as follows. All of the regulating action is secured by a change in the series voltage drop in the winding 6. This voltage drop is proportional to the current through this winding multiplied by its reactance. When the supply voltage remains constant and the load voltage changes there is a linear change in saturating current in the series winding 8 and due to the shape of the magnetization curve for the core 7 this produces a non-linear change in the reactance of the winding 6. Thus, compensation for changes in load current is secured by changing the reactance factor of the voltage drop in the winding 6. On the other hand, when the load is constant and the supply voltage varies the device 11 causes a non-linear change in current in the portion of the winding 6 on the supply side of the device 11, thus, compensation for supply voltage variations is made by changing the current factor of the reactance voltage drop in the winding 6. However, by reason of the difference in characteristics of the main direct current saturable reactor and the self-saturating reactor 11 the same percentage changes in supply voltage and in load current produce different percentage changes in the current and the reactance factors respectively of the regulating voltage drop in the winding 6. Consequently, in order to secure proper compensation for both variations in supply voltage and variations in load current the changes in current produced by the device 7 in response to changes in supply voltage should act on a different proportion of the total reactance of the winding 6 than is the case when the reactance of the winding 6 is varied in order to compensate for load changes. I have found that by suitably choosing the intermediate point to which the device 11 is connected to the winding 6 that equally good compensation is obtained for both load and supply voltage variations.

The regulation is further improved by adjusting the rheostat 12 until the amount of uni-directional flux produced by the shunt direct current winding 8 is such as to cause the portion of the series reactance winding 6 which is traversed by the current supplied to the device 11 to match the characteristic of the device 11. I have also found that the presence of the shunt direct current winding 9 materially increases the range of loads over which proper compensation for variations in supply voltage may be obtained.

The direct current winding 9 also increases the range of supply voltage variation over which satisfactory compensation for this variation is obtained. An explanation of this is as follows. As the winding 9 provides a definite amount of uni-directional flux in the core 7, the reactance of the winding 6 when a small amount of alternating current flows therethrough is lower than it would be if the shunt winding 9 were not present. Therefore, when the supply voltage increases the increase in non-linear current which is caused to flow through the winding 6 by means of the non-linear characteristic of the shunt device 11 will cause the alternating current ampere turns of the reactor to buck or partially neutralize the effect of the direct current ampere turns of the shunt winding 9, thereby causing an increase in the reactance of the winding 6. In other words, the direct current shunt winding 9 has the effect of adding an increase in reactance of the winding 6 to the effect of the increase in current in the winding 6 caused by an increase in supply voltage, so that both the components of the voltage across the winding 6 automatically increase as the supply voltage increases.

Still another improved effect of the shunt winding 9 is to extend the range of load current variations over which satisfactory regulation is obtained. This extension of the range applies particularly to the no-load and light-load end of the load current variation range. An explanation of this is as follows. The uni-directional flux produced in the core 7 by the shunt winding 9 causes the main alternating current winding 6 of the reactor to have a lower magnetizing reactance and, hence, draw a higher magnetizing current at a given voltage than would be the case if the shunt winding 9 were not present. Therefore, by properly adjusting the rheostat 12 the magnetizing reactance of the winding 6 can be made less than the magnetizing reactance of the shunt device 11, so that at any given applied voltage the majority of this voltage will be across the shunt device 11 rather than across the series winding 6. Therefore, the device 11 can be operated at the steepest or most sensitive part of its magnetization curve so that the maximum and most sensitive regulating effect can be obtained from this device.

A further result which follows from being able to operate the device 11 at the most critical point on its saturation curve is that the speed of regulation of the circuit as a whole is appreciably increased.

In the modification shown in Fig. 2, the main reactor is provided with a three-legged core and the variable reactance alternating current winding 6 is divided into two sections found respectively on the outer legs of the core and connected respectively in circuit with the two sides or conductors of the alternating current supply circuit. The self-saturating reactor 11 is connected across the supply circuit in such a way that each terminal thereof is connected to an intermediate point on the respective sections of the series winding 6. As shown in this figure, the reactor 11 is provided with taps which are for the purpose of adjusting the degree of compensation for line voltage fluctuations in accordance with changes in the resistance of the rectifier 3 caused by aging of this device.

The operation of Fig. 2 is generally the same as that of Fig. 1 and should be obvious from the foregoing description. One advantage that it has over Fig. 1 is that the wave form of the current it takes from the source of alternating current is considerably nearer sinusoidal.

In Fig. 3 the bridge-connected dry disk rectifier 3 is replaced by a vacuum tube rectifier shown by way of example as a rectifier 14 of the biphase type having a common anode connection and separate cathodes energized respectively by separate cathode heating windings 15 on the supply transformer 4.

In general, the regulating operation in Fig. 3 is the same as for the previous figures, although it is to be noted that the series winding sections 6 in Fig. 3 do not carry alternating load current but carry pulsating half wave direct load current. However, these winding sections do carry alternating current by virtue of the shunt connection of the self-saturating reactor 11. It is also to be noted that the half wave pulses of flux in the center leg of the three-legged core caused by the half wave currents in the respective winding sections 6 are in the same direction as the unidirectional flux produced by both the series saturating winding 8 and the shunt saturated winding 9. In this manner, increases in load produce a double saturating effect in the reactor in that the fluxes produced by the winding sections 6 aid the series winding 8 in saturating the core.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In an automatic regulator system, an alternating current supply circuit, a direct current load circuit, a bridge-connected rectifier interconnecting said circuits, an iron core reactor having a variable reactance alternating current winding connected in series in said supply circuit, a self-saturating iron core reactor connected in shunt circuit relation with said supply circuit on the load side of at least a portion of said variable reactance winding, the iron core of said reactor having a direct current saturated leg, a saturating winding on said leg connected in series in said load circuit, a second saturating winding on said leg connected in shunt with said load circuit, and a short-circuited winding on said leg.

2. In an automatic regulator system, an alternating current supply circuit, a direct current load circuit, a dry disk type rectifier interconnecting said circuits, an iron core reactor having a variable reactance alternating current winding connected in series in said supply circuit, a negative impedance current characteristic arrangement connected in shunt circuit relation to said supply circuit on the load side of at least a portion of said variable reactance winding, a direct current saturating winding on said reactor connected in shunt circuit relation to said direct current load circuit, and a rheostat connected for adjusting the current in said direct current saturating winding.

3. In an automatic regulator system, an alternating current supply circuit, a direct current load circuit, a rectifier interconnecting said circuits, a saturable iron core reactor having a variable reactance alternating current winding connected in said supply circuit, a direct current saturating winding on said reactor connected to carry a current proportional to the current in said load circuit whereby changes in current in said load circuit will cause inverse variations in the reactance of said alternating current winding in such a manner as to maintain the voltage of said load circuit substantially independent of changes in load current therein, a self-saturating iron core reactor connected in shunt circuit with said supply circuit, the core of said self-saturating reactor being composed of a material having a different saturation curve than that of the material comprising the core of the direct current saturated reactor whereby a given percentage change in supply voltage will cause a greater relative change in reactance of said self-saturating reactor than the same percentage change in load current will cause in the reactance of the direct current saturated reactor, one terminal of said saturating reaction being connected to an intermediate point on said variable reactance winding which is so located thereon that changes in the reactance voltage drop in that portion of the reactance winding on the supply side of said point caused by changes in current taken by said self-saturating reactor with changes in supply voltage will be such as substantially to neutralize said changes in supply voltage whereby the load circuit is substantially independent of changes in supply voltage.

4. In an automatic regulator system, an alternating current supply circuit, a direct current load circuit, a dry disk type rectifier interconnecting said circuits, said rectifier having the property of increasing its resistance in the normal direction of current flow with age thereof, an iron core reactor having an alternating current winding connected in said supply circuit and having a direct current winding effectively connected in said load circuit whereby changes in load current will vary the reactance of said alternating current winding in an inverse manner so as to compensate for the load circuit for changes in voltage caused by changes in load current, and means for adjusting the ratio of the load current to the ampere turns of said direct current winding so as to compensate for the effect of aging of said rectifier.

5. In an automatic regulator system, an alternating current supply circuit, a direct current load circuit, a dry disk type rectifier interconnecting said circuits, said rectifier having the property of increasing its resistance in the normal direction of current flow with age thereof, an iron core reactor having an alternating current winding connected in said supply circuit and having a direct current winding effectively connected in said load circuit whereby changes in load current will vary the reactance of said alternating current winding in an inverse manner so as to compensate for the load circuit for changes in voltage caused by changes in load current, and a plurality of adjustable taps on said series winding for adjusting the ratio of load current to effective ampere turns of said direct current winding so as to compensate for the effect of aging of said rectifier.

6. In in automatic regulator system, an alternating current supply circuit, a direct current load circuit, a dry disk type rectifier interconnecting said circuits, said rectifier having the property of increasing its resistance in the normal direction of current flow with increases in age thereof, an impedance connected in said supply circuit, a negative impedance current characteristic device connected in shunt circuit relation with said supply circuit on the load side of said series impedance whereby the non-linear changes in current flow through said series impedance with changes in supply voltage which are caused by the negative impedance current characteristic of said shunt-connected device will substantially compensate said load circuit for changes in supply voltage, and means for adjusting the value of said shunt impedance so as to compensate for resistance changes in said rectifier caused by the aging thereof.

7. In an automatic regulator system, an alternating current supply circuit, a direct current load circuit, a dry disk type rectifier interconnecting said circuits, said rectifier having the property of increasing its resistance in the normal direction of current flow with increases in age thereof, an impedance connected in said supply circuit, a negative impedance current characteristic device connected in shunt circuit relation with said supply circuit on the load side of said series impedance whereby the non-linear changes in current flow through said series impedance with changes in supply voltage which are caused by the negative impedance current characteristic of said shunt connected device will substantially compensate said load circuit for changes in supply voltage, and adjustable tap connections on said shunt impedance for correcting the line voltage compensating action of the circuit for the aging of said rectifier.

STANLEY M. HANLEY.